Nov. 15, 1932.    C. GEROLD    1,887,755
HOUSING FOR UNIVERSAL JOINTS
Filed June 4, 1930
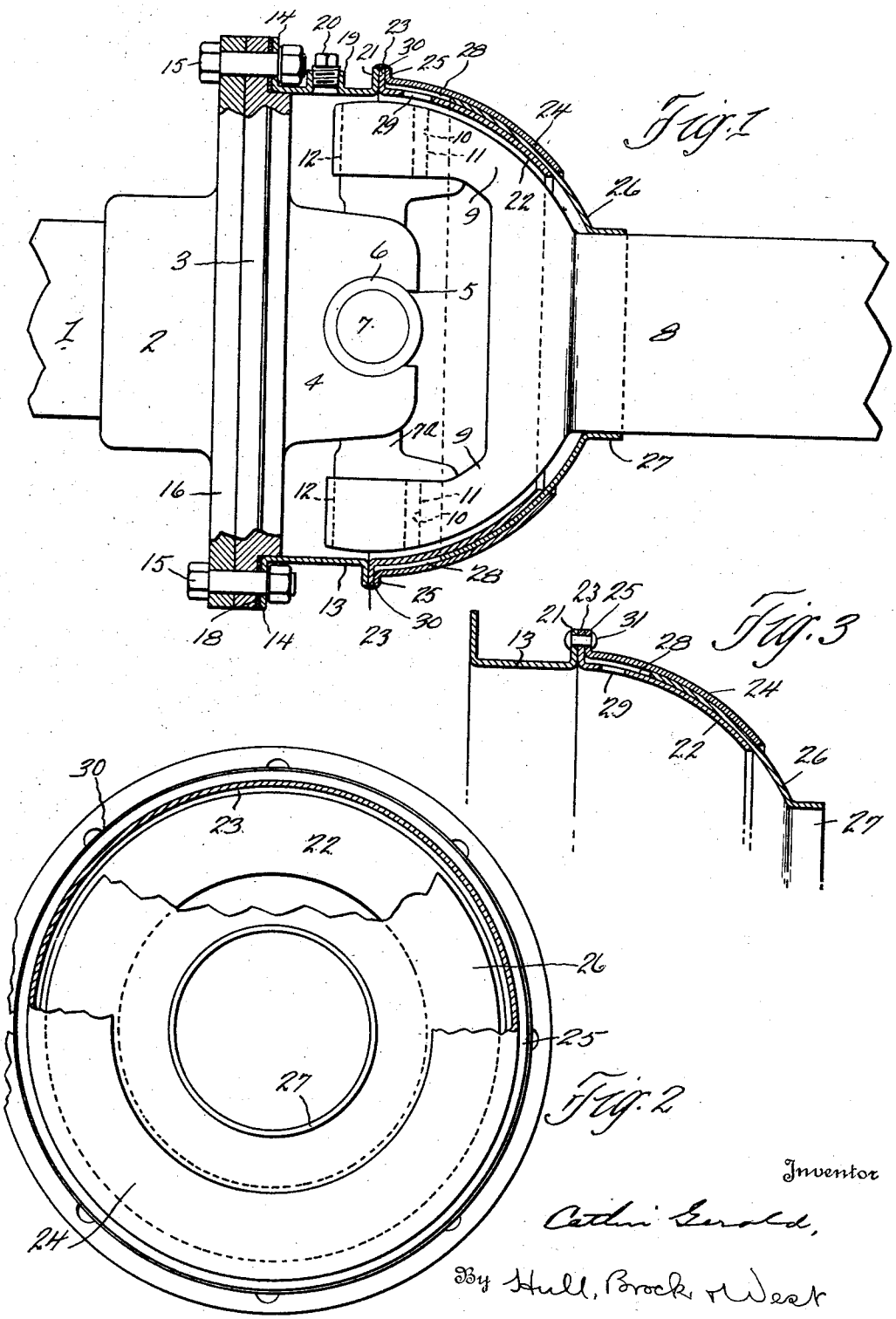

Patented Nov. 15, 1932

1,887,755

UNITED STATES PATENT OFFICE

CATLIN GEROLD, OF LOS ANGELES, CALIFORNIA

HOUSING FOR UNIVERSAL JOINTS

Application filed June 4, 1930. Serial No. 459,138.

This invention relates to universal joints, and more particularly to the housings which are employed for the purpose of retaining the lubricant and for supplying the same in operative relation to the working parts of such joints.

It is the general purpose and object of the invention to provide, for joints of the character referred to, a housing comprising a plurality of spherical interleaving housing sections, each section being in the shape of a segment of a sphere and the sections being so constructed and arranged as to permit of their relative oscillatory movement, due to the rotation of the misalined shaft sections to which they are respectively connected, while preventing the escape of lubricant from the housing. A further object of the invention is to enable this result to be accomplished without the use of special packings and springs, such as have been customarily employed heretofore in connection with housings of the general type to which my invention relates. A still further object of the invention is to provide a housing which, while realizing the objects and advantages above recited, will permit the housing to be used wherever an ordinary universal joint has been employed, without interference with the various parts of the chassis assembly.

Further and more limited objects of the invention will appear hereinafter and will be realized in and through the construction and arrangement of parts shown in the drawing hereof, wherein Fig. 1 represents a sectional elevation of a universal joint equipped with a housing constructed in accordance with my invention and showing the ends of the shaft sections connected by said joint; Fig. 2 an end elevation of the housing, with certain parts broken away; and Fig. 3 a detail in section through a portion of a housing construction showing a modification of the invention disclosed in Figs. 1 and 2.

Describing by reference characters the various parts illustrated herein, 1 denotes one of the shaft sections to be united, the same being provided with a hub 2, having a flange 3 provided with yoke arms 4 each having, in the embodiment shown herein, a slotted bearing bore 5 each receiving a bushing 6 for a trunnion 7 of a cross pin 7ª of a connecting cross member.

8 denotes the hub of another shaft section, the same being provided with yokes 9, similar to the yokes 4, each yoke having a bearing bore 10 which is preferably similar to the slotted bearing bore 5 and also being provided each with a bushing 11 similar to the bushing 6 for the reception of a trunnion 12 of the other cross pin of said cross member. The construction of universal joint thus far described is merely illustrative of one type of such joint for connecting adjacent ends of two opposed shaft sections.

For the purpose of supplying lubricant to the working parts of the joint as well as for retaining lubricant, I provide a sectional housing, the same comprising a cylindrical housing member 13 of less diameter than the flange 3, and itself having a radially outwardly extending flange 14 adapted to be secured to the flange 3 by bolts 15 extending through the said flanges and through a companion flange 16. A packing ring or gasket 18 is inserted between the flanges 3 and 14.

The cylindrical housing section 13 is provided with an internally threaded filling opening 19, through which lubricant may be inserted into the housing, said opening being provided with a plug 20.

At its end opposite the flange 14, the section 13 is provided with a shorter outwardly extending radial flange 21. 22 denotes an inner spherical housing section provided at its enlarged end with an outwardly extending radial flange 23 preferably of the same external diameter as the flange 21 and abutting against the latter flange. The outer spherical housing section 24 is provided at its enlarged end with an outwardly extending radial flange 25, which is also preferably of the same external diameter as the external diameters of the flanges 21 and 23.

Cooperating with the housing sections 22 and 24 is an intermediate housing section 26 having a cylindrical neck 27 closely fitting the hub 8 and secured thereto, the section 26 having a spherical portion which is also concentric with the sections 22 and 24, the thickness of the metal comprising the section 26 being such that the main body thereof fits fairly snugly within the space provided between the last mentioned sections. The section 26 is of such extent as to provide, between its enlarged end and the flange 25, a chamber 28 which receives lubricant from the housing by centrifugal action through one or more openings 29. The flanges 21, 23 and 25 may be united in any convenient manner, as by automatically welding the same together, as indicated at 30, or by riveting the same together, as shown at 31 in Fig. 3. The flange 25 is sufficiently shorter than the flange 23 to provide, when the outer ends of the said flanges are in register and united, an intermediate space of sufficient width for the reception of the section 26 and for the provision of the chamber 28.

The spherical portion of each housing section 22, 24 and 26 is concentric with the intersection of the axes of the cross pins 7ª, thereby to accommodate oscillatory movement between the section 26 on the one hand and the sections 22 and 24 on the other hand, due to lack of alignment of the shaft sections which are connected by the universal joint.

In operation, as the shaft sections are rotated, the housing rotates therewith and the lubricant is thrown outwardly by centrifugal action through the opening or openings 29 into the chamber 28. Furthermore, owing to the centrifugal action, there will be a constant tendency for the lubricant to seek the part of said chamber which is of the greatest diameter, which will automatically prevent any leakage of lubricant between the interengaging portions of the spherical housing sections, while supplying sufficient lubricant, by capillary action, between such interengaging portions of said sections.

It will be evident that, because of the construction and arrangement of parts shown herein, an extremely simple and effective lubricant-containing housing is provided for universal joints and one which will not only insure the lubrication of the parts of the joint within the housing, but will prevent the escape of lubricant from the housing without the use of springs and packings such as have been employed heretofore, while securing proper lubrication of the interengaging housing sections. Furthermore, due to the manner of constructing the housing, it may be applied to existing types of universal joints and employed wherever such joints have been employed heretofore, without interference of the housing with various parts of the chassis assembly—this being due to the fact that the housing proper is of less diameter than the diameter of the flanges 3 and 4 of the joint.

Having thus described my invention, what I claim is:

1. The combination, with a pair of shaft sections and means for uniting the same comprising a universal joint, of a housing enclosing the universal joint, the said housing comprising a housing member secured at one end to one of said shaft sections and having a radially outwardly extending flange at its opposite end, inner and outer concentric spherical housing sections, each of the last mentioned sections having a radially outwardly extending flange at its enlarged end, the outer portions of said housing-section flanges being united with the flange of the housing member, the flange on the inner housing section being interposed between the other two flanges, there being a space provided between the spherical sections, and a third spherical section having its enlarged end of smaller diameter than the maximum diameters of the other sections and interposed between such sections, the last mentioned section having a reduced end secured to the other of said shaft sections, there being a chamber provided between the inner and outer spherical sections beyond the enlarged end of the intermediate section, and means for supplying lubricant by centrifugal action from said housing to said chamber.

2. The combination, with a pair of shaft sections and means for uniting the same comprising a flange carried by one of said sections, a yoke carried by said flange, a yoke carried by the opposite shaft section, a cross member connecting one pair of yokes with the other, of a housing enclosing the cross member and connections, the said housing comprising a cylindrical member having a radially outwardly extending flange at one end thereof secured to the first-mentioned flange and having at its opposite end a radially outwardly extending flange of less diameter than the first mentioned flanges, inner and outer concentric spherical housing sections, each of the last mentioned sections having a radial flange at its enlarged end, means for securing the flange of the outer spherical section to the second flange on the cylindrical member with the flange of the inner spherical section interposed between the other flanges, thereby to provide a space between such spherical sections, and a third spherical section having its enlarged end of smaller diameter than the maximum diameters of the other sections and interposed between such sections, the last mentioned section having a reduced end secured to the other of said shaft sections, there being a chamber provided between the inner and outer spherical sections beyond the enlarged end of the intermediate section, with one or more openings in the innermost spherical section for the supply of lubricant to said chamber by centrifugal action from the interior of the housing.

3. The combination, with a pair of shaft sections and means for uniting the same comprising a flange carried by one of said sections, a yoke carried by said flange, a yoke carried by the opposite shaft section and a cross member connecting one pair of yokes with the other, of a housing enclosing the cross member and connections, the said housing comprising a section having at one end a radially outwardly extending flange secured to the first mentioned flange, and having at its opposite end a radially outwardly extending flange of less diameter than its other flange, inner and outer spherical housing section members each having their enlarged ends secured to the second mentioned flange on the first section with a space between such spherical sections, a third spherical section extending between the reduced ends of the first mentioned spherical sections and having its enlarged end of smaller diameter than the larger diameters of the first two spherical sections, thereby providing a chamber between such enlarged ends of the said spherical sections, the reduced end of the intermediate section being secured to the other of the said shaft sections, and means for supplying lubricant by centrifugal action from the interior of said housing to said chamber.

4. The combination, with a pair of shaft sections and means for uniting the same comprising a flange carried by one of said sections, a yoke carried by said flange, a yoke carried by the opposite shaft section and a cross member connecting one pair of yokes with the other, of a housing enclosing the cross member and connections, the said housing comprising a section connected at one end to said flange, an inner and an outer spherical housing section secured at their enlarged ends to the opposite end of the first section with a space between their spherical portions, an intermediate spherical section secured at one end to the other shaft section and extending into the space between the other two spherical sections and having its enlarged end of smaller diameter than the diameters of the enlarged ends of the first mentioned sections thereby providing a chamber between the enlarged ends of the inner and outer spherical sections beyond the enlarged end of the intermediate section, there being one or more openings for the supply of lubricant by centrifugal action through the inner spherical section to the aforesaid chamber, the said housing being of less diameter than said flange from its point of connection therewith to its point of connection with the opposite shaft section.

5. The combination, with a pair of shaft sections and means for uniting the same comprising a flange carried by one of said sections, a yoke carried by said flange, a yoke carried by the opposite shaft section and a cross member connecting one pair of yokes with the other, of a housing enclosing the cross member and connections, the said housing comprising a section connected at one end to said flange and having at its opposite end a radially outwardly extending flange, an inner and an outer spherical housing section each having a radially outwardly extending flange, the flange of the inner section being interposed between the flanges of the outer section and of the first mentioned section and the said flanges being united together to provide a space between the inner and outer spherical sections, an intermediate spherical section secured at one end to the other shaft section and extending upwardly into the space between the other two spherical sections and having its enlarged end of smaller diameter than the diameters of the enlarged ends of the first mentioned sections thereby to provide a chamber between the enlarged ends of the inner and outer spherical sections and beyond the enlarged end of the intermediate section, there being one or more openings for the supply of lubricant by centrifugal action through the inner spherical section to the aforesaid chamber, the flanges uniting the housing sections being of less diameter than the first mentioned flange.

6. The combination, with a pair of shaft sections and means for uniting the same comprising a universal joint, of a housing enclosing the universal joint, the said housing comprising a housing member secured at one end to one of said shaft sections, inner and outer concentric spherical housing sections secured at their enlarged ends to the adjacent end of the said housing member and in spaced relation to each other, a third spherical section also concentric with the first mentioned spherical sections and having its enlarged end of smaller diameter than the maximum diameters of the other sections and interposed between such sections, with the provision of a chamber beyond the enlarged end of such third spherical section, the third spherical section having a reduced end secured to the other of said shaft sections, and means for supplying lubricant by centrifugal action from the said housing to the said chamber, the diameter of the housing at the point including the connections between the first and second spherical sections and the housing member being no greater than the greatest diameter of the housing member.

7. The combination with a pair of shaft sections, of an annular flange secured to one of said sections, means for uniting said sections comprising a universal joint, a housing enclosing said universal joint and comprising a housing member secured to said flange, inner and outer concentric spherical housing sections secured at their enlarged ends to the adjacent end of the housing member with their spherical portions in spaced relation to each other, a third spherical section also concentric with the first-mentioned spherical sections and having its enlarged end of less diameter than the maximum diameters of the other sections and interposed between such sections with the provision of a chamber beyond the enlarged end of such third spherical section, the third spherical section having a reduced end secured to the other of said shaft sections, and means for supplying a lubricant by centrifugal action from the housing to the said chamber, the maximum outside diameter of the spherical sections being no greater than the maximum diameter of said flange.

In testimony whereof, I hereunto affix my signature.

CATLIN GEROLD.